US011158291B2

(12) United States Patent
Shao (10) Patent No.: US 11,158,291 B2
(45) Date of Patent: Oct. 26, 2021

(54) IMAGE DISPLAY METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Yuewei Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/951,818

(22) Filed: Nov. 18, 2020

(65) Prior Publication Data

US 2021/0074245 A1 Mar. 11, 2021

Related U.S. Application Data

(63) Continuation of application No. PCT/CN2019/112901, filed on Oct. 24, 2019.

(30) Foreign Application Priority Data

Nov. 12, 2018 (CN) .......................... 201811340566.3

(51) Int. Cl.
*G06T 13/80* (2011.01)
*G09G 5/373* (2006.01)

(52) U.S. Cl.
CPC ............. *G09G 5/373* (2013.01); *G06T 13/80* (2013.01); *G09G 2340/045* (2013.01); *G09G 2340/0464* (2013.01)

(58) Field of Classification Search
CPC ........... G09G 5/373; G09G 2340/0464; G09G 2340/045; G09G 2340/12; G06T 13/80; G06T 19/00; G01C 21/00
See application file for complete search history.

(56) References Cited

U.S. PATENT DOCUMENTS

2013/0322634 A1* 12/2013 Bennett ................... G06F 3/167
381/17
2014/0071119 A1* 3/2014 Piemonte .............. G06T 19/003
345/419

(Continued)

FOREIGN PATENT DOCUMENTS

CN 104075719 A 10/2014
CN 105008861 A 10/2015

(Continued)

OTHER PUBLICATIONS

Tencent Technology, WO, PCT/CN2019/112901, Feb. 1, 2020, 5 pgs.

(Continued)

*Primary Examiner* — Xilin Guo
(74) *Attorney, Agent, or Firm* — Morgan, Lewis & Bockius LLP (57) ABSTRACT

This application discloses an image display method performed at an electronic device. The electronic device obtains a target location of a virtual object in a map scene displayed on a screen of the electronic device. After identifying a virtual building within a preset range centered on the target location, the electronic device gradually decreases the virtual building from a display height of the virtual building to a first target display shape of the virtual building. Next, the electronic device displays the first target display shape of the virtual building in the map scene. In response to a movement of the virtual object in the map scene, the electronic device gradually resumes the virtual building from the first target display shape to the display height when the virtual building is outside the preset range centered on the updated target location of the virtual object in the map scene.

20 Claims, 6 Drawing Sheets

(56) References Cited

U.S. PATENT DOCUMENTS

| | | | |
|---|---|---|---|
| 2014/0267282 A1* | 9/2014 | Ren | G09G 5/391 |
| | | | 345/428 |
| 2014/0274151 A1* | 9/2014 | Pattabiraman | H04B 7/22 |
| | | | 455/456.3 |
| 2015/0354979 A1 | 12/2015 | Cengil | |
| 2017/0294047 A1 | 10/2017 | Asakura | |

FOREIGN PATENT DOCUMENTS

| | | |
|---|---|---|
| CN | 109685909 A | 4/2019 |
| EP | 1024467 A2 | 8/2000 |
| EP | 1746391 A1 | 1/2007 |

OTHER PUBLICATIONS

Tencent Technology, IPRP, PCT/CN2019/112901, May 11, 2021, 6 pgs.
Tencent Technology, ISR, PCT/CN2019/112901, Feb. 1, 2020, 2 pgs.
Extended European Search Report, EP19883783.3, dated Aug. 30, 2021, 9 pgs.

\* cited by examiner

IMAGE DISPLAY METHOD AND APPARATUS, STORAGE MEDIUM, AND ELECTRONIC DEVICE

CROSS REFERENCE TO RELATED APPLICATIONS

This application is a continuation application of PCT Patent Application No. PCT/CN2019/112901, entitled "METHOD AND DEVICE FOR IMAGE DISPLAY, STORAGE MEDIUM AND ELECTRONIC DEVICE" filed on Oct. 24, 2019, which claims priority to Chinese Patent Application No. 201811340566.3, filed with the State Intellectual Property Office of the People's Republic of China on Nov. 12, 2018, and entitled "IMAGE DISPLAY METHOD AND APPARATUS, STORAGE MEDIUM, AND ELECTRONIC DEVICE", all of which are incorporated herein by reference in their entirety.

FIELD OF THE TECHNOLOGY

This application relates to the field of image processing, and specifically, to an image display method and apparatus, a storage medium, and an electronic device.

BACKGROUND OF THE APPLICATION

In location-based service applications, a corresponding virtual object may be displayed in a map scene based on a current location of a user, so as to improve a sense of substitution of the user.

SUMMARY

Embodiments of this application provide an image display method and apparatus, a storage medium, and an electronic device, to resolve at least the technical problem in the related art that a displayed building may cause an interference to a field of view of a viewer.

According to an aspect of the embodiments of this application, an image display method is performed at an electronic device. The image display method includes: obtaining a target location of a virtual object in a map scene displayed on a screen of the electronic device; identifying a virtual building within a preset range centered on the target location in the map scene; gradually decreasing the virtual building from a display height of the virtual building to a first target display shape of the virtual building; displaying the first target display shape of the virtual building in the map scene; detecting an update to the target location of the virtual object in the map scene; and gradually resuming the virtual building from the first target display shape to the display height of the virtual building in accordance with a determination that the virtual building is outside the preset range centered on the updated target location of the virtual object in the map scene.

According to another aspect of the embodiments of this application, a non-transitory computer-readable storage medium is further provided, the storage medium storing a plurality of computer programs, the computer programs being configured to perform the foregoing method.

According to still another aspect of the embodiments of this application, an electronic device is further provided. The electronic device includes a memory and a processor, the memory storing a plurality of computer programs that, when executed by the processor, cause the electronic device to perform the foregoing method.

In the embodiments of this application, a target location of a virtual object is obtained in a map scene displayed on a screen of an electronic device; when there is a virtual building within a preset range centered on the target location in the map scene, a display height of the virtual building is decreased to a first target display shape of the virtual building; and the first target display shape of the virtual building is displayed in the map scene. The display height of the virtual building is decreased, so that the field of view of the virtual object may be improved, and an interference of the virtual building on the field of view of the virtual object may be reduced.

BRIEF DESCRIPTION OF THE DRAWINGS

The accompanying drawings described herein are used to provide further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make solutions of this application more comprehensible for a person skilled in the art, the technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The terms such as "first" and "second" in the specification, the claims and the accompanying drawings of this application are intended to distinguish between similar objects, but are not necessarily used for describing a specific sequence or a precedence level. The data termed in such a way are interchangeable in proper circumstances, so that the embodiments of this application described herein can be implemented in orders except the order illustrated or described herein. Moreover, the terms "include", "have", and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device.

Unity game engine: is a cross-platform game engine, and the C#language is usually used for game logic development.

Game side: is a C#script part related to game logic based on a game engine such as Unity, and this part is independent of a system platform.

Native side: is platform-related parts other than the game side, including Android java-side logic, iOS objC code, and a link library part that implements map rendering in the embodiments of this application.

Mesh: during rendering, a mesh represents a drawable entity, a mesh includes at least a set of vertex data, and each vertex may include attributes such as a coordinate and a normal vector. A mesh may alternatively include a piece of index data used for indexing vertex data.

Shader: during rendering, the shader is a piece of instruction code applied to a graphics processing unit (GPU) and used for instructing the GPU to perform mesh rendering and generation of a rendering result, for example, calculate vertex transformation and calculate illumination.

Location-based service (LBS): is a value-added service that provides a user with corresponding services by obtaining a location of the user.

Figure 1:
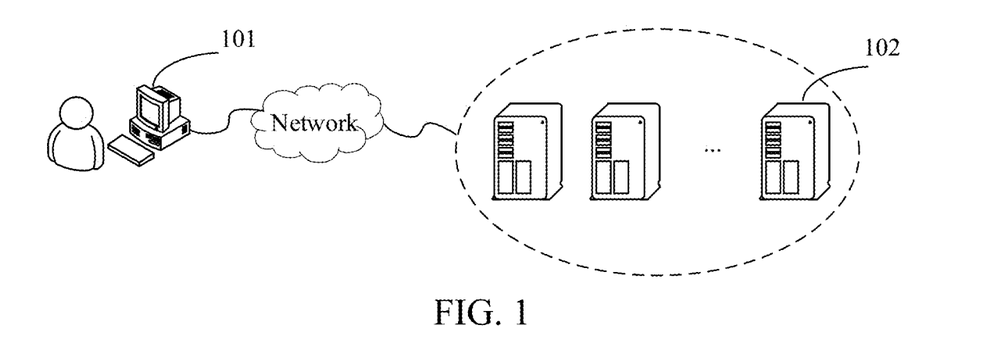
FIG. 1 is a schematic diagram of a network architecture according to an embodiment of this application.

According to an aspect of the embodiments of this application, an image display method is provided. In this embodiment, the foregoing image display method may be applied to a hardware environment formed by a terminal 101 and a server 102 shown in FIG. 1. As shown in FIG. 1, the terminal 101 is connected to the server 102 through a network, and the server may be used for providing an LBS service for the terminal. The network includes, but is not limited to: a wide area network, a metropolitan area network, or a local area network. The terminal 101 may be a mobile phone terminal, a PC terminal, a notebook terminal or a tablet computer terminal.

The image display method in the embodiments of this application may be performed by the terminal 101, or may be performed by a client installed on the terminal 101. Scenes to which the technical solution of this application is applicable include, but are not limited to, the following scenes:

The technical solution of this application may be applied to social scenes using augmented reality (AR), virtual reality (VR) or other technologies. The foregoing server is equivalent to a social server, and may provide social services and social surrounding services (such as an LBS service) for each terminal on which a social client is installed. In a social application using the AR or the VR, after a user logs in, a virtual object corresponding to the logged-in user may be rendered in the social scene. The location of the virtual object on a map of the virtual scene may be mapped to the user in the real environment, and the virtual objects on the ground often need to be rendered in the virtual scene. Sizes of the objects are generally much smaller than the buildings in the virtual scene. Therefore, when a viewing angle is relatively low, the objects are often blocked by the buildings. Actually, the objects are often very important, and are not expected to be blocked. Based on retaining the display of the buildings by using the technical solution of this application, the buildings in a certain range around themselves are lowered, so that important items do not block the virtual objects, while buildings in a farther range are normally displayed, so as to ensure that a scene of being full of high-rise buildings may still be seen visually, and make it convenient for the virtual objects to discover surrounding important objects.

The technical solution of this application may be further applied to a game scene providing the LBS service, for example, a multiplayer online battle arena (MOBA) game, a first-person shooter game (FPS), a third-person shooter game (TPS) or the like. Similarly, in an LBS game, a role model (such as a virtual object) of a player, and a game object on a map are often rendered on the map. Sizes of the objects are generally much smaller than the buildings. Therefore, when a viewing angle is relatively low, the objects are often blocked by the virtual buildings. However, in the game, the objects are often very important, and are not expected to be blocked. Therefore, based on retaining the display of the virtual buildings by using the new virtual building display solution provided by this application, the virtual buildings in the certain range around themselves are lowered, so that the important items do not block the player, while the virtual buildings in the farther range are normally displayed, so as to ensure that the scene of being full of high-rise buildings may still be seen visually in the game.

For ease of description, in the following embodiments of this application, the technical solution provided by this application is illustrated mainly by using a possible implementation in which a terminal is used as an electronic device.

Figure 2:
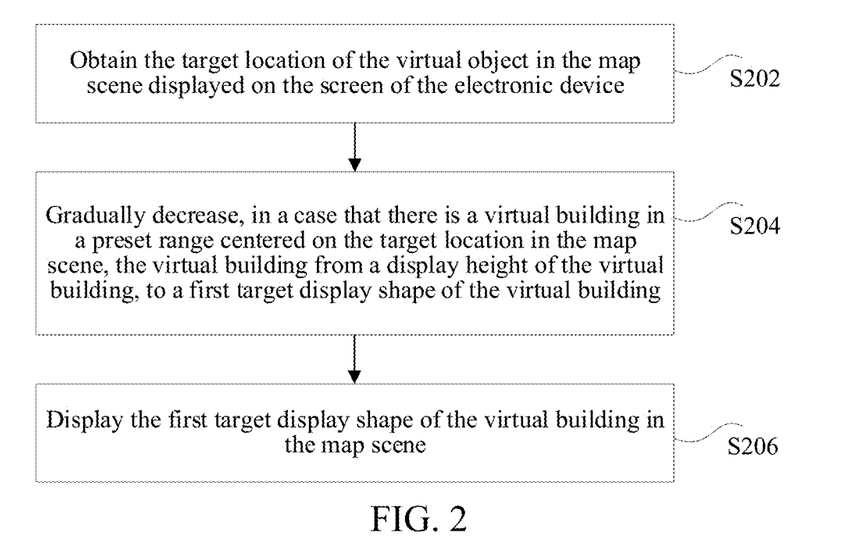
FIG. 2 is a flowchart of an image display method according to an embodiment of this application.

An implementation of an implementation solution of this application used in the foregoing scene is further described in detail below with reference to steps shown in FIG. 2. FIG. 2 is a flowchart of an image display method according to an embodiment of this application. As shown in FIG. 2, the image display method includes:

S202. Obtain the target location of the virtual object in the map scene displayed on the screen of the electronic device using a client.

In a possible implementation, the virtual object is configured to be allowed to move in the map scene.

The foregoing client may be a client of a social application implemented by using the AR, the VR or other technologies, a client of a game application that provides an LBS service, or the like. Correspondingly, the foregoing map scene may be a map of a virtual social scene corresponding to a real environment, a map of a game scene corresponding to a real environment, or the like.

A movement of the virtual object in the map scene may be controlled by the target object (such as a social user or a game player) using the foregoing client. For example, the target object directly manipulates the virtual object in the client to move, or the virtual object moves along with the movement of the target object.

S204. Decrease, when there is a virtual building in a preset range centered on the target location in the map scene, the virtual building from a display height of the virtual building to a first target display shape of the virtual building. In some embodiments, the electronic device first identifies the virtual building within the preset range centered on the target location in the map scene and then gradually decreases the virtual building from the display height of the virtual building to the first target display shape of the virtual building.

The foregoing preset range may refer to an area range of a shape centered on the target location, such as a circle with a fixed radius, a square with a fixed length, a rectangle with a fixed length and width, or a rhombus with a fixed side length.

In a case that there is the virtual building that blocks the virtual object in the map scene, and the virtual building is located in the preset range centered on the target location, the display height of the virtual building is adjusted in the map scene, so that the virtual building does not block view of the virtual object, and important items and objects in the field of view in the preset range centered on the target location can be seen from the field of view of the virtual object conveniently.

S206. Display the first target display shape of the virtual building in the map scene. In some embodiments, the electronic device then detects an update to the target location of the virtual object in the map scene. When the virtual building is outside the preset range centered on the updated target location of the virtual object in the map scene, the electronic device then gradually resumes the virtual building from the first target display shape to the display height of the virtual building.

Figure 3:
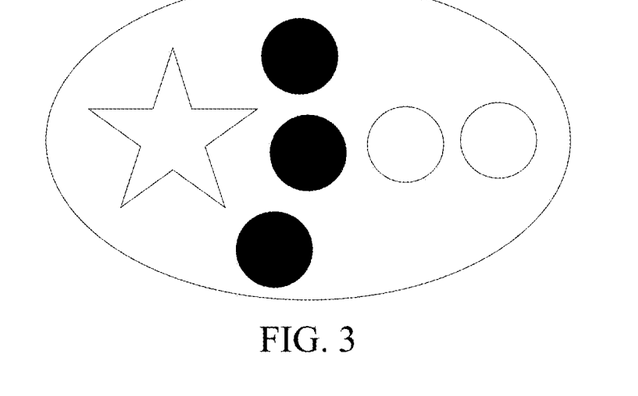
FIG. 3 is a schematic diagram of an optional map scene according to an embodiment of this application.

As shown in FIG. 3, a five-pointed star represents a role model as the virtual object, and the remaining solid circles and hollow circles represent objects (such as a virtual building and a virtual prop) located in a line of sight range of the virtual object. After using the technical solution in the embodiments of this application, display heights of the virtual buildings (shown by the solid circles) around the role model shown in FIG. 3 are decreased. For example, the virtual buildings are in a flat shape, and do not block the virtual object itself, and do not block the virtual prop in FIG. 3 either, such as a drum and other relatively low objects (shown by the hollow circles). Therefore, the field of view of the virtual object may be improved, and an interference of the virtual building on the field of view of the virtual object may be reduced.

Figure 4:
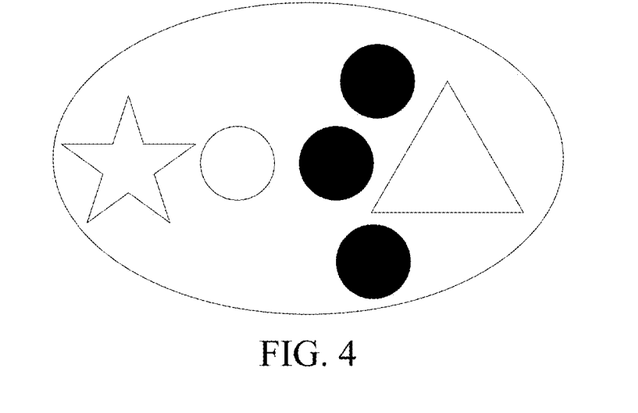
FIG. 4 is a schematic diagram of an optional map scene according to an embodiment of this application.

As shown in FIG. 4, a five-pointed star represents a role model as the virtual object, and the remaining solid circles, hollow circle and triangle represent objects (such as a virtual building and a virtual prop) located in a line of sight range of the virtual object. The triangle represents a low object, the hollow circle represents a low object that does not affect the field of view of the virtual object, for example, the object may be the virtual prop such as a drum, and the solid circles represent the virtual buildings that block the object represented by the triangle. After using the technical solution in the embodiments of this application, the display heights of the virtual buildings represented by the solid circles may be decreased. For example, the virtual buildings are displayed in a flat shape, so as not to block the object represented by the triangle. Therefore, the field of view of the virtual object may be improved, and an interference of the virtual building on the field of view of the virtual object may be reduced.

Through the foregoing steps, a target location of a virtual object is obtained in a map scene displayed on the client; when there is the virtual building in the preset range centered on the target location in the map scene, the display height of the virtual building is decreased, to obtain a first target display shape of the virtual building; and the first target display shape of the virtual building is displayed in the map scene. The display height of the virtual building is decreased, so that the field of view of the virtual object may be improved, an interference of the virtual building on the field of view of the virtual object may be reduced, and the technical problem in the related art that a displayed building may cause an interference to a field of view of a viewer is resolved.

The technical solution in this application being applied to an LBS game is used as an example for describing the technical solution of this application below in detail.

Optionally, the virtual object is used for representing the target object in the real environment, and the target object may participate in the LBS game through a mobile terminal. Therefore, the target object may be replaced with the mobile terminal, which is equivalent to the virtual object representing the mobile terminal in the real environment. The target location of the virtual object in the map scene is used for representing a location of the mobile terminal in the real environment. In other words, the map scene may be obtained by simulating the real environment, and the location in the map scene may be obtained by mapping the location in the real environment. For example, the map scene may be considered to be obtained by scaling the map of the real environment in equal proportions, and the virtual building in the map scene is used for representing the corresponding real building in the real environment.

The foregoing virtual object is configured to be allowed to move in the map scene. For example, the virtual object is configured to be allowed to move in the map scene by following movement of the mobile terminal in the real environment. In other words, when a player carrying the mobile terminal moves in the real environment, the location of the mobile terminal is equivalent to a location of the player, and the mobile terminal may detect its own location to control the movement of the virtual object in the virtual scene.

Optionally, the obtaining the target location of the virtual object in the map scene displayed on the client includes: determining the target location of the virtual object in the map scene according to the location of the mobile terminal in the real environment. For example, the location of the mobile terminal used for representing the virtual object in the real environment is obtained; and the location of the mobile terminal in the real environment is mapped to the location in the map scene displayed on the client as the target location of the virtual object. For example, there is a location A in the real environment, and there is a location a for simulating A in the map scene. If the location of the mobile terminal in the real environment is A, the location of the virtual object in the map scene may be confirmed as a.

In this embodiments of this application, by adjusting (e.g., gradually converting) the display shape of a building that blocks a relatively low object and that is in a preset range from the target location of the virtual object, the relatively low object may be accurately displayed in a simulated environment and is not blocked, so as to resolve the technical problem of inaccurate display of the location of the relatively low object in the map scene of the related art, and achieve the technical effect of improving the accuracy of displaying a location.

Optionally, for other building objects that are in a preset range centered on the target location and do not block other relatively low objects (important objects) may also be adjusted at the same time. An adjustment of other objects may be the same as that of the foregoing virtual building. That is, in this embodiment, only the virtual building that blocks the relatively low object may be adjusted, or the virtual building and other objects that do not block the relatively low object may be adjusted at the same time. When the virtual building blocks an identifier of the relatively low object, the height of the virtual building may be decreased, so that the displayed virtual object has no height or a relatively small height. The relatively small height may be the height of the top of a foot of a character (the virtual object) in FIG. 5, or other heights. At the relatively small height, the virtual building does not block the foregoing identifier.

A manner of adjusting the virtual building is the same as that of adjusting other objects. The manner of adjusting the virtual building is described below, and other objects may be adjusted in the same manner.

Optionally, the decreasing the display height of the virtual building to obtain a first target display shape of the virtual building includes: adjusting the display shape of the virtual building in the map scene to a flat shape. That is, in this implementation, the first target display shape is the flat shape.

In the foregoing embodiment, the displaying the first target display shape of the virtual building in the map scene includes: playing a first animation in the map scene, the first animation being used for displaying that the display height of the virtual building gradually decreases; and displaying the first target display shape of the virtual building in the map scene after finishing playing the first animation.

Optionally, the first animation played in the map scene includes a plurality of frames of pictures, and any frame of picture may be determined in the following manner: obtaining, by using a central processing unit in a terminal on which the client is run, a current height of a vertex of the virtual building in a mesh of the map scene, the mesh being used for recording spatial location data of the vertex of the virtual building, and the spatial location data including the current height of the vertex of the virtual building; adjusting the current height of the vertex of the virtual building in the spatial location data to a target height, to obtain updated spatial location data, the target height being less than the current height; and transmitting the updated spatial location data of the vertex of the virtual building to a graphics processing unit in the terminal for drawing, to obtain a drawn image, the drawn image being used as a frame of picture of the first animation.

Figure 5:
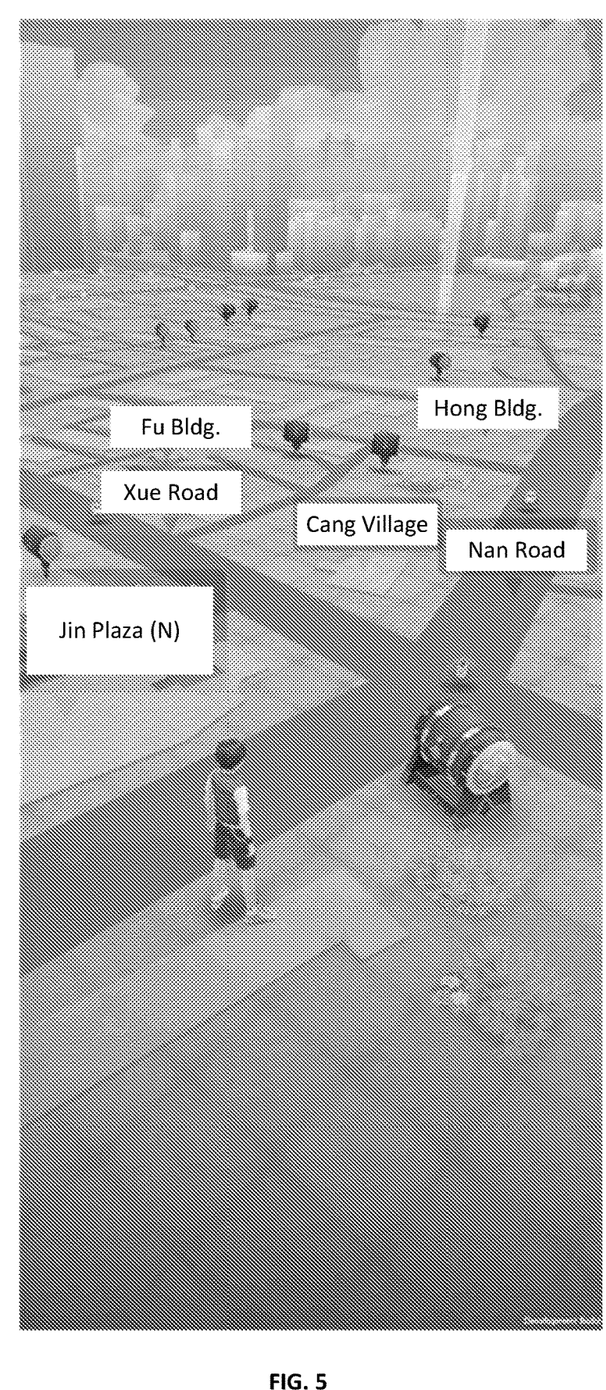
FIG. 5 is a schematic diagram of an optional map scene according to an embodiment of this application.

The display shape of the virtual building is displayed in the map scene that simulates the real environment. As shown in FIG. 4 and FIG. 5, an upper part of FIG. 5 shows an appearance of relatively tall buildings outside the preset range centered on the target location. Buildings in the preset range centered on the target location of the virtual object are further displayed in other locations, and are shown in flat and irregular shapes. At the same time, a schematic diagram of the relatively low object such as a prop drum is also shown.

Data of the mesh is adjusted by the central processing unit, so that vertex data of the virtual building recorded in the mesh is changed, and the height of the building corresponding to the vertex is decreased according to the changed vertex data. Each time the data of the mesh is updated, a frame of image is drawn and the frame of image is displayed. The data of the mesh is modified again according to the height of the building in the currently displayed image, and a graphics processing unit is used for drawing, so that the height of the building is decreased. Each frame of image is used as a frame of picture of the first animation, and a process of drawing and displaying a plurality of frames of images is a process of playing the first animation.

A mesh records the vertex data of a plurality of objects, and the vertex data of an object is used as a group of the mesh. When adjusting the data in the mesh, a plurality of sets of data may be adjusted at the same time, that is, vertexes of a plurality of buildings may be adjusted at the same time, thereby realizing a change of adjusting heights of the plurality of buildings. For example, the plurality of buildings may be raised or lowered at the same time; or some buildings may be raised, and at the same time, some buildings may be lowered.

Figure 6:
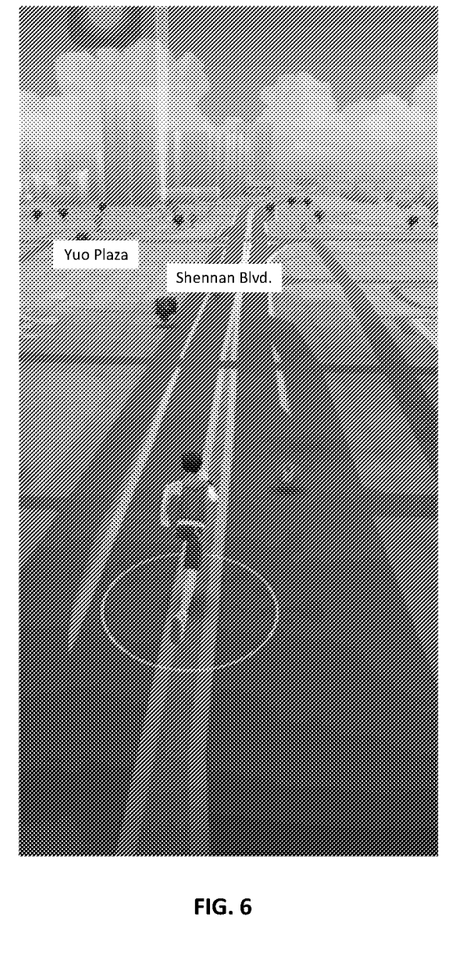
FIG. 6 is a schematic diagram of an optional map scene according to an embodiment of this application.
Figure 7:
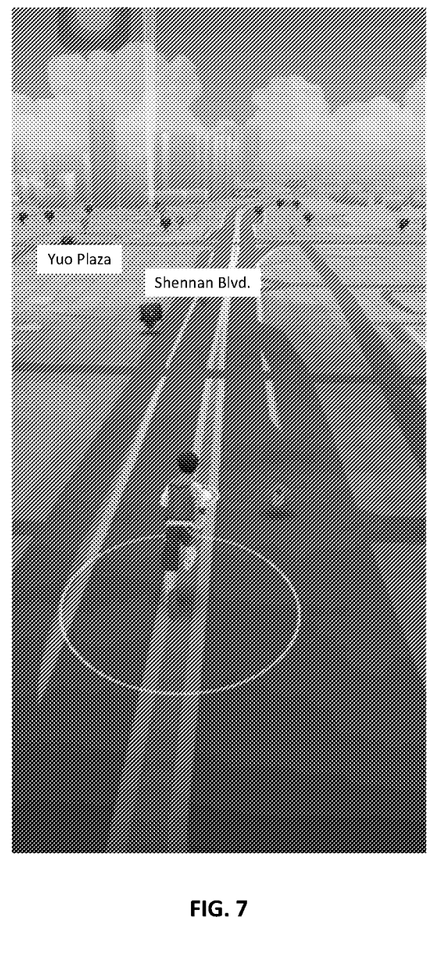
FIG. 7 is a schematic diagram of an optional map scene according to an embodiment of this application.
Figure 8:
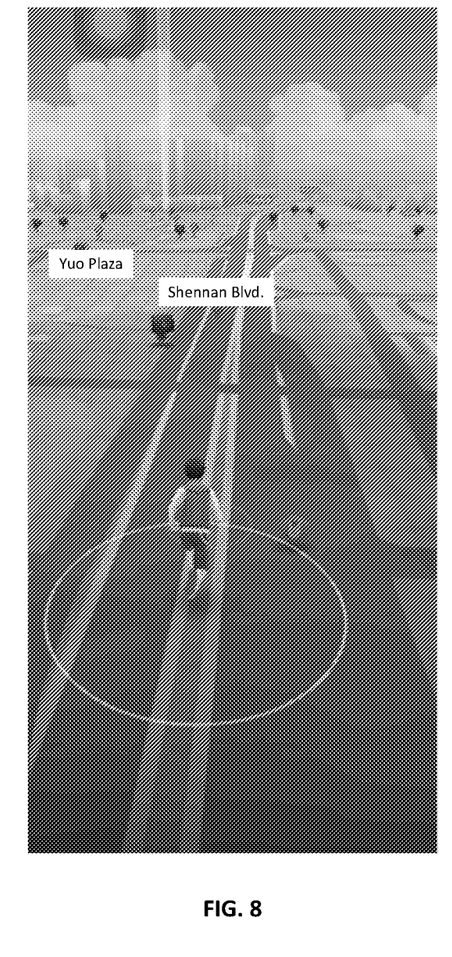
FIG. 8 is a schematic diagram of an optional map scene according to an embodiment of this application.

With reference to a virtual building to which arrows in FIG. 6 to FIG. 8 point, FIG. 6 shows a normal height of the two virtual buildings located side-by-side at the top-left corner of the map scene, FIG. 7 shows a height of the right-side virtual building being lowered while the left-side virtual building remaining the same height, and FIG. 8 shows the right-side virtual building displayed in a flat state while the left-side virtual building being lowered, that is, an identifier of the building is displayed. A process of sequentially displaying FIG. 6 to FIG. 8 is the process of playing the first animation. Only 3 frames of pictures herein are used for illustrating the process of playing the first animation. In an actual playing process, more than 3 frames of pictures may be set to represent the first animation that the height of the building gradually decreases.

For example, a distance between the building and a location of the user in the real environment is detected. If the distance between the building and a geographic location of the user is less than or equal to 5000 meters, and a previous distance is greater than 5000 meters, a descending animation starts to play. After the playing of the descending animation finishes, the building enters the flat state, and the building in the flat state is displayed in a simulated environment.

In the flat state, if the distance between the virtual building and the target location of the virtual object is greater than 5000 meters, and the previous distance is less than or equal to 5000 meters, an ascending animation (that is, the first animation) starts to play, and the virtual building is updated from the flat state to an appearance image. Similarly, this embodiment may be implemented in the following manner:

After displaying the first target display shape of the virtual building in the map scene, when the virtual object moves in the map scene and the virtual building is not in a preset range centered on a target location of the virtual object after movement, the display height of the virtual building is increased to obtain a second target display shape of the virtual building; and the second target display shape of the virtual building is displayed in the map scene.

Optionally, the displaying the second target display shape of the virtual building in the map scene includes: playing a second animation in the map scene, the second animation being used for displaying that the display height of the virtual building gradually increases; and displaying the second target display shape of the virtual building in the map scene after finishing playing the second animation.

With reference to a virtual building to which arrows in FIG. 6 to FIG. 8 point, FIG. 6 shows a normal height of the virtual building, FIG. 7 shows a height of the lowered virtual building, and FIG. 8 shows the virtual building displayed in a flat state, that is, an identifier of the building is displayed. A process of sequentially displaying FIG. 8, FIG. 7 and FIG. 6 is the process of playing the second animation. Only 3 frames of pictures herein are used for illustrating the process of playing the second animation. In the actual playing process, more than 3 frames of pictures may be set to represent the second animation that the height of the building gradually increases.

For example, a distance between the virtual building and the target location of the virtual object is detected. In the flat state, if the distance between the virtual building and the target location of the virtual object is greater than 5000 meters, and the previous distance is less than or equal to 5000 meters, the ascending animation (that is, the second animation) starts to play, and the virtual building is updated from the flat state to the appearance image.

To make the description simple, the foregoing method embodiments are stated as a series of action combinations. However, a person skilled in the art needs to learn that this application is not limited to the described sequence of the actions because according to this application, some steps may use another sequence or may be simultaneously performed. In addition, it is to be understood by a person skilled in the art that the embodiments described in the specification are all exemplary embodiments and the related actions and modules are not mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing to the related art may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of this application.

Figure 9:
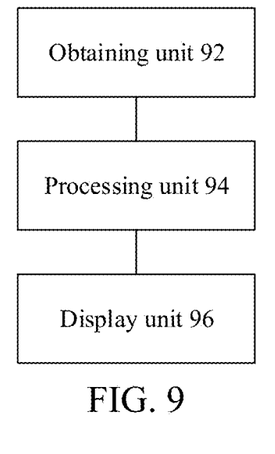
FIG. 9 is a schematic diagram of an image display apparatus according to an embodiment of this application.

According to another aspect of the embodiments of this application, an image display apparatus configured to implement the foregoing image display method is further provided. As shown in FIG. 9, the apparatus includes: an obtaining unit 92, a processing unit 94 and a display unit 96.

The obtaining unit 92 is configured to obtain a target location of a virtual object in a map scene displayed on a client, where optionally, the virtual object is configured to be allowed to move in the map scene.

The foregoing client may be a client of a social application implemented by using the AR, the VR and other technologies, a client of an LBS game application, or the like. Correspondingly, the foregoing map scene may be a map of a virtual social scene corresponding to a real environment, a map of a game scene corresponding to a real environment, or the like.

A movement of the virtual object in the map scene is controlled by the target object (such as a social user or a game player) using the foregoing client. For example, the target object directly manipulates the virtual object in the client to move, or the virtual object moves along with the movement of the target object.

The processing unit 94 is configured to decrease, when there is a virtual building in a preset range centered on the target location in the map scene, a display height of the virtual building, to obtain a first target display shape of the virtual building.

The foregoing preset range may refer to an area range of a shape centered on the target location, such as a circle with a fixed radius, a square with a fixed length, a rectangle with a fixed length and width, or a rhombus with a fixed side length.

In a case that there is the virtual building that blocks the virtual object in the map scene, and the virtual building is located in the preset range centered on the target location, the display height of the virtual building is adjusted in the map scene, so that the virtual building does not block view of the virtual object, and objects in the field of view in the preset range centered on the target location can be seen by the virtual object conveniently.

The display unit 96 is configured to display the first target display shape of the virtual building in the map scene.

Through the foregoing modules, the target location of the virtual object is obtained in the map scene displayed on the client; when there is the virtual building in the preset range centered on the target location in the map scene, the display height of the virtual building is decreased, to obtain the first target display shape of the virtual building; and the first target display shape of the virtual building is displayed in the map scene. The display height of the virtual building is decreased, so that the field of view of the virtual object may be improved, an interference of the virtual building on the field of view of the virtual object may be reduced, and the technical problem in the related art that a displayed building may cause an interference to a field of view of a viewer is resolved.

Optionally, when the target location of the virtual object is obtained in the map scene displayed on the client, the obtaining unit may obtain the target location of the virtual object in the map scene. The virtual object is used for representing a mobile terminal in a real environment, the target location of the virtual object in the map scene is used for representing a location of the mobile terminal in the real environment, and the virtual building in the map scene is used for representing a corresponding real building in the real environment.

Optionally, the virtual object being configured to be allowed to move in the map scene includes: the virtual object being configured to be allowed to move in the map scene by following movement of the mobile terminal in the real environment.

Optionally, when the target location of the virtual object is obtained in the map scene displayed on the client, the obtaining unit may obtain the location of the mobile terminal used for representing the virtual object in the real environment; and map the location of the mobile terminal in the real environment to the location in the map scene displayed on the client as the target location of the virtual object.

Optionally, the processing unit is further configured to: adjust the display shape of the virtual building in the map scene to a flat shape.

Optionally, the display unit is further configured to: play a first animation in the map scene, the first animation being used for displaying that the display height of the virtual building gradually decreases; and display the first target display shape of the virtual building in the map scene after finishing playing the first animation.

Optionally, for any frame of picture in the first animation, the processing unit includes: an obtaining module, configured to obtain, by using a central processing unit in a terminal on which the client is run, a current height of a vertex of the virtual building in a mesh of the map scene, the mesh being used for recording spatial location data of the vertex of the virtual building, and the spatial location data including the current height of the vertex of the virtual building; an adjustment module, configured to adjust the current height of the vertex of the virtual building in the spatial location data to a target height, to obtain updated spatial location data, the target height being less than the current height; a drawing module, configured to transmit the updated spatial location data of the vertex of the virtual building to a graphics processing unit in the terminal for drawing, to obtain a drawn image, the drawn image being used as a frame of picture of the first animation.

Data of the mesh is adjusted by the central processing unit, so that vertex data of the virtual building recorded in the mesh is changed, and the height of the building corresponding to the vertex is decreased according to the changed vertex data. Each time the data of the mesh is updated, a frame of image is drawn and the frame of image is displayed. The data of the mesh is modified again according to the height of the building in the currently displayed image, and a graphics processing unit is used for drawing, so that the height of the building is decreased. Each frame of image is used as a frame of picture of the first animation, and a process of drawing and displaying a plurality of frames of images is a process of playing the first animation.

Optionally, after displaying the first target display shape of the virtual building in the map scene, the display unit may be further configured to: increase, when the virtual object moves in the map scene and the virtual building is not in a preset range centered on a target location of the virtual object after movement, the display height of the virtual building, to obtain a second target display shape of the virtual building; and display the second target display shape of the virtual building in the map scene.

Optionally, the display unit may play, when increasing the display height of the virtual building, a second animation in the map scene, where the second animation is used for displaying that the display height of the virtual building gradually increases; and may display, when displaying the second target display shape of the virtual building in the map scene, the second target display shape of the virtual building after finishing playing the second animation.

With reference to FIG. 6 to FIG. 8, FIG. 6 shows the normal height of the building, FIG. 7 shows the height of the lowered building, and FIG. 8 shows the building displayed in the flat state, that is, the identifier of the building is displayed. A process of sequentially displaying FIG. 8, FIG. 7 and FIG. 6 is the process of playing the second animation. Only 3 frames of pictures herein are used for illustrating the process of playing the second animation. In the actual playing process, more than 3 frames of pictures may be set to represent the second animation that the height of the building gradually increases.

Figure 10:
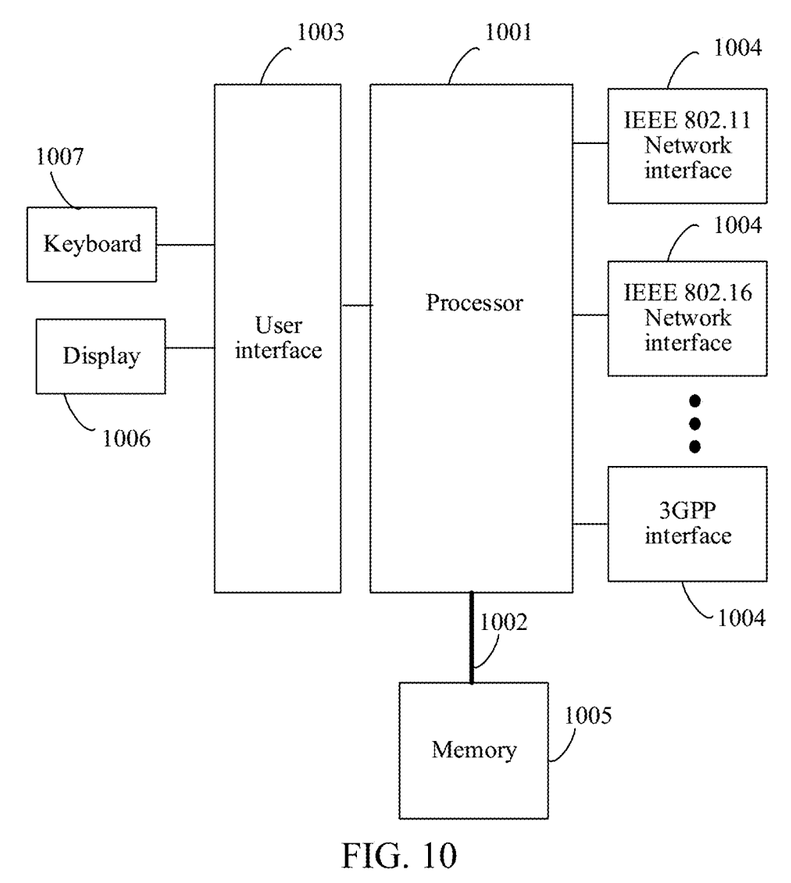
FIG. 10 is a structural block diagram of an electronic device according to an embodiment of this application.

According to still another aspect of the embodiments of this application, an electronic device configured to implement the foregoing image display method is further provided. As shown in FIG. 10, the electronic device includes a memory and a processor, the memory storing a computer program, and the processor being configured to perform steps in any one of the foregoing method embodiments by using the computer program.

Optionally, FIG. 10 is a structural block diagram of an electronic device according to an embodiment of this application. As shown in FIG. 10, the electronic device may include: one or more (only one is shown in the figure) processors 1001, at least one communication bus 1002, a user interface 1003, at least one transmission device 1004, and a memory 1005. The communication bus 1002 is configured to implement connection and communication between these components. The user interface 1003 may include a display 1006 and a keyboard 1007. The transmission device 1004 may optionally include a standard wired interface and wireless interface.

Optionally, in this embodiment, the foregoing electronic device may be located in at least one of a plurality of network devices of a computer network.

Optionally, in this embodiment, the foregoing processor may be configured to perform the following steps through a computer program:

obtaining a target location of a virtual object in a map scene displayed on a client;

decreasing, when there is a virtual building in a preset range centered on the target location in the map scene, a display height of the virtual building, to obtain a first target display shape of the virtual building; and displaying a first target display shape of the virtual building in the map scene.

Optionally, a person of ordinary skill in the art may understand that, the structure shown in FIG. 10 is only illustrative. The electronic device may be a terminal device such as a smartphone (for example, an Android mobile phone or an iOS mobile phone), a tablet computer, a palmtop computer, a mobile Internet device (MID), or a PAD. FIG. 10 does not limit the structure of the electronic device. For example, the electronic device may alternatively include more or fewer components (such as a network interface and a display apparatus) than those shown in FIG. 10, or has a configuration different from that shown in FIG. 10.

The memory 1005 may be configured to store a software program and module, for example, a program instruction/module corresponding to the image display method and apparatus in the embodiments of this application. The processor 1001 runs the software program and module stored in the memory 1005, to perform various functional application and data processing, that is, implement the foregoing image display method. The memory 1005 may include a high-speed random memory, and may also include a non-volatile memory, for example, one or more magnetic storage apparatuses, a flash memory, or another nonvolatile solid-state memory. In some embodiments, the memory 1005 may further include memories remotely disposed relative to the processor 1001, and the remote memories can be connected to the terminal through a network. Instances of the network include, but are not limited to, the Internet, an intranet, a local area network, a mobile communication network, and a combination thereof.

The foregoing transmission apparatus 1004 is configured to receive or transmit data through a network. The specific examples of the network may include a wired network and a wireless network. In one example, the transmission device 1004 includes a network interface controller (NIC), which may be connected to other network devices and routers via a network cable to communicate with the Internet or a local area network. In one example, the transmission device 1004 is a Radio Frequency (RF) module, which is configured to communicate with the Internet in a wireless manner.

Specifically, the memory 1005 is configured to store data in a mesh.

By using this embodiment of this application, a solution of an image display method is provided. The target location of the virtual object is obtained in the map scene displayed on the client; when there is the virtual building in the preset range centered on the target location in the map scene, the display height of the virtual building is decreased, to obtain the first target display shape of the virtual building; and the first target display shape of the virtual building is displayed in the map scene. The display height of the virtual building is decreased, so that the field of view of the virtual object may be improved, an interference of the virtual building on the field of view of the virtual object may be reduced, and the technical problem in the related art that a displayed building may cause an interference to a field of view of a viewer is resolved.

An embodiment of this application further provides a storage medium, storing a computer program, the computer program being used for performing operations in any one of the foregoing method embodiments when run.

Optionally, in this embodiment, the storage medium may be configured to store a computer program for performing the following steps:

obtaining a target location of a virtual object in a map scene displayed on a client;

decreasing, when there is a virtual building in a preset range centered on the target location in the map scene, a display height of the virtual building, to obtain a first target display shape of the virtual building; and displaying a first target display shape of the virtual building in the map scene.

Optionally, the storage medium is further configured to store a computer program used for performing the following steps:

obtaining, by using a central processing unit in a terminal on which the client is run, a current height of a vertex of the virtual building in a mesh of the map scene, the mesh being used for recording spatial location data of the vertex of the virtual building, and the spatial location data including the current height of the vertex of the virtual building;

adjusting the current height of the vertex of the virtual building in the spatial location data to a target height, to obtain updated spatial location data, the target height being less than the current height;

transmitting the updated spatial location data of the vertex of the virtual building to a graphics processing unit in the terminal for drawing, to obtain a drawn image; and displaying the drawn image in the map scene, the drawn image being used as a frame of picture of a first animation.

Optionally, the storage medium is further configured to store the computer program used for performing the following steps: obtaining the target location of the virtual object in the map scene, where the virtual object is used for representing a mobile terminal in a real environment, the target location of the virtual object in the map scene is used for representing a location of the mobile terminal in the real environment, and the virtual building in the map scene is used for representing a corresponding real building in the real environment.

Optionally, the storage medium is further configured to store the computer program used for performing the following steps: obtaining the location of the mobile terminal used for representing the virtual object in the real environment; and mapping the location of the mobile terminal in the real environment to the location in the map scene displayed on the client as the target location of the virtual object.

Optionally, the storage medium is further configured to store the computer program used for performing the following steps: increasing, when the virtual object moves in the map scene and the virtual building is not in a preset range centered on a target location of the virtual object after movement, the display height of the virtual building, to obtain a second target display shape of the virtual building; and displaying the second target display shape of the virtual building in the map scene.

Optionally, the storage medium is further configured to store a computer program used for performing the steps included in the methods in the foregoing embodiments, and details are not described again in this embodiment.

Optionally, an embodiment of this application further provides a computer program product including instructions, the instructions, when run on a computer, causing the computer to perform the method according to the foregoing embodiments.

Optionally, in this embodiment, a person of ordinary skill in the art can understand that all or some of the steps of the methods in the foregoing embodiments may be implemented by a program instructing relevant hardware of a terminal device. The program may be stored in a computer-readable storage medium, and the storage medium may include a flash drive, a read-only memory (ROM), a random access memory (RAM), a magnetic disk, a compact disc, and the like.

In a case that the integrated unit in the foregoing embodiments is implemented in the form of a software function unit and sold or used as an independent product, the integrated unit can be stored in the foregoing computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, the disclosed client may be implemented in another manner. The apparatus embodiment described above is merely an example. For example, the unit division is merely logical function division and may be another division during actual implementation. For example, a plurality of units or components may be combined or integrated into another system, or some features may be ignored or not executed. In addition, the coupling, or direct coupling, or communication connection between the displayed or discussed components may be the indirect coupling or communication connection by means of some interfaces, units, or modules, and may be in electrical or other forms. In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The units described as separate parts may or may not be physically separate, and the parts displayed as units may or may not be physical units, may be located in one place, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may make improvements and modifications without departing from the principle of this application, and all such improvements and modifications fall within the protection scope of this application.

What is claimed is:

1. An image display method performed at an electronic device having a processor and memory storing a plurality of computer programs to be executed by the processor, the method comprising:
    obtaining, by the electronic device, a target location of a virtual object in a map scene displayed on a screen of the electronic device;
    identifying, by the electronic device, a virtual building within a preset range centered on the target location in the map scene;
    gradually decreasing, by the electronic device, the virtual building from a display height of the virtual building to a first target display shape of the virtual building;
    displaying, by the electronic device, the first target display shape of the virtual building in the map scene;
    detecting, by the electronic device, an update to the target location of the virtual object in the map scene;
    gradually resuming, by the electronic device, the virtual building from the first target display shape to the display height of the virtual building in accordance with a determination that the virtual building is outside the preset range centered on the updated target location of the virtual object in the map scene.

2. The method according to claim 1, wherein the virtual object is configured to be allowed to move in the map scene.

3. The method according to claim 1, wherein the target location of the virtual object in the map scene is used for representing a location of the electronic device in a real environment, and the virtual building in the map scene is used for representing a corresponding real building in the real environment.

4. The method according to claim 3, wherein the virtual object is configured to be allowed to move in the map scene by following movement of the electronic device in the real environment.

5. The method according to claim 1, wherein the obtaining, by the electronic device, a target location of a virtual object in a map scene displayed on a screen of the electronic device comprises:
    obtaining, by the electronic device, the location of the electronic device used for representing the virtual object in the real environment; and
    mapping, by the electronic device, the location of the electronic device in the real environment to the location in the map scene as the target location of the virtual object.

6. The method according to claim 1, wherein the first target display shape comprises a flat shape, and the gradually decreasing, by the electronic device, the virtual building from the display height of the virtual building to the first target display shape of the virtual building comprises:
    gradually converting, by the electronic device, the display shape of the virtual building in the map scene to the flat shape.

7. The method according to claim 1, wherein the displaying, by the electronic device, the first target display shape of the virtual building in the map scene comprises:
    playing, by the electronic device, a first animation in the map scene, the first animation being used for displaying that the display height of the virtual building gradually decreases; and
    displaying, by the electronic device, the first target display shape of the virtual building in the map scene after finishing playing the first animation.

8. The method according to claim 7, wherein any frame of picture in the first animation is determined in the following manner:
    obtaining, by the electronic device by using the processor, a current height of a vertex of the virtual building in a mesh of the map scene, the mesh being used for recording spatial location data of the vertex of the virtual building, and the spatial location data comprising the current height of the vertex of the virtual building;
    adjusting, by the electronic device, the current height of the vertex of the virtual building in the spatial location data to a target height, to obtain updated spatial location data, the target height being less than the current height; and
    transmitting, by the electronic device, the updated spatial location data of the vertex of the virtual building to a graphics processing unit in the terminal for drawing, to obtain a drawn image, the drawn image being used as a frame of picture of the first animation.

9. The method according to claim 1, wherein the gradually resuming, by the electronic device, the virtual building from the first target display shape to the display height of the virtual building in accordance with a determination that the virtual building is outside the preset range centered on the updated target location of the virtual object in the map scene comprises:
    gradually increasing, by the electronic device, the display height of the virtual building, to obtain a second target display shape of the virtual building; and
    displaying, by the electronic device, the second target display shape of the virtual building in the map scene.

10. The method according to claim 9, wherein the displaying, by the electronic device, the second target display shape of the virtual building in the map scene comprises:
    playing, by the electronic device, a second animation in the map scene, the second animation being used for displaying that the display height of the virtual building gradually increases; and
    displaying, by the electronic device, the second target display shape of the virtual building in the map scene after finishing playing the second animation.

11. An electronic device, comprising a memory and a processor, the memory storing a plurality of computer programs that, when executed by the processor, cause the electronic device to perform a plurality of operations including:
    obtaining a target location of a virtual object in a map scene displayed on a screen of the electronic device;
    identifying a virtual building within a preset range centered on the target location in the map scene;
    gradually decreasing the virtual building from a display height of the virtual building to a first target display shape of the virtual building;
    displaying the first target display shape of the virtual building in the map scene;
    detecting an update to the target location of the virtual object in the map scene;
    gradually resuming the virtual building from the first target display shape to the display height of the virtual building in accordance with a determination that the virtual building is outside the preset range centered on the updated target location of the virtual object in the map scene.

12. The electronic device according to claim 11, wherein the target location of the virtual object in the map scene is used for representing a location of the electronic device in a real environment, and the virtual building in the map scene is used for representing a corresponding real building in the real environment.

13. The electronic device according to claim 12, wherein the virtual object is configured to be allowed to move in the map scene by following movement of the electronic device in the real environment.

14. The electronic device according to claim 11, wherein the obtaining a target location of a virtual object in a map scene displayed on a screen of the electronic device comprises:
   obtaining the location of the electronic device used for representing the virtual object in the real environment; and
   mapping the location of the electronic device in the real environment to the location in the map scene as the target location of the virtual object.

15. The electronic device according to claim 11, wherein the first target display shape comprises a flat shape, and the gradually decreasing the virtual building from the display height of the virtual building to the first target display shape of the virtual building comprises:
   gradually converting the display shape of the virtual building in the map scene to the flat shape.

16. The electronic device according to claim 11, wherein the displaying the first target display shape of the virtual building in the map scene comprises:
   playing a first animation in the map scene, the first animation being used for displaying that the display height of the virtual building gradually decreases; and
   displaying the first target display shape of the virtual building in the map scene after finishing playing the first animation.

17. The electronic device according to claim 16, wherein any frame of picture in the first animation is determined in the following manner:
   obtaining, using the processor, a current height of a vertex of the virtual building in a mesh of the map scene, the mesh being used for recording spatial location data of the vertex of the virtual building, and the spatial location data comprising the current height of the vertex of the virtual building;
   adjusting the current height of the vertex of the virtual building in the spatial location data to a target height, to obtain updated spatial location data, the target height being less than the current height; and
   transmitting the updated spatial location data of the vertex of the virtual building to a graphics processing unit in the terminal for drawing, to obtain a drawn image, the drawn image being used as a frame of picture of the first animation.

18. The electronic device according to claim 11, wherein the gradually resuming the virtual building from the first target display shape to the display height of the virtual building in accordance with a determination that the virtual building is outside the preset range centered on the updated target location of the virtual object in the map scene comprises:
   gradually increasing the display height of the virtual building, to obtain a second target display shape of the virtual building; and
   displaying the second target display shape of the virtual building in the map scene.

19. The electronic device according to claim 18, wherein the displaying the second target display shape of the virtual building in the map scene comprises:
   playing a second animation in the map scene, the second animation being used for displaying that the display height of the virtual building gradually increases; and
   displaying the second target display shape of the virtual building in the map scene after finishing playing the second animation.

20. A non-transitory computer-readable storage medium, storing a plurality of computer programs, the computer programs, when executed by a processor of an electronic device, causing the electronic device to perform a plurality of operations including:
   obtaining a target location of a virtual object in a map scene displayed on a screen of the electronic device;
   identifying a virtual building within a preset range centered on the target location in the map scene;
   gradually decreasing the virtual building from a display height of the virtual building to a first target display shape of the virtual building;
   displaying the first target display shape of the virtual building in the map scene;
   detecting an update to the target location of the virtual object in the map scene;
   gradually resuming the virtual building from the first target display shape to the display height of the virtual building in accordance with a determination that the virtual building is outside the preset range centered on the updated target location of the virtual object in the map scene.

* * * * *